United States Patent
Ugajin (10) Patent No.: US 12,334,985 B2
(45) Date of Patent: Jun. 17, 2025

(54) PROCESSING DEVICE, TRANSMISSION DEVICE, COMMUNICATION DEVICE, PROCESSING METHOD AND RECORDING MEDIUM

(71) Applicant: NEC Corporation, Tokyo (JP)

(72) Inventor: Kazusa Ugajin, Tokyo (JP)

(73) Assignee: NEC CORPORATION, Tokyo (JP)

( * ) Notice: Subject to any disclaimer, the term of this patent is extended or adjusted under 35 U.S.C. 154(b) by 203 days.

(21) Appl. No.: 18/014,437

(22) PCT Filed: Apr. 20, 2021

(86) PCT No.: PCT/JP2021/015979
§ 371 (c)(1),
(2) Date: Jan. 4, 2023

(87) PCT Pub. No.: WO2022/009503
PCT Pub. Date: Jan. 13, 2022

(65) Prior Publication Data
US 2023/0336249 A1    Oct. 19, 2023

(30) Foreign Application Priority Data
Jul. 9, 2020    (JP) ................................. 2020-118599

(51) Int. Cl.
*H04B 10/54*    (2013.01)
*H04B 10/50*    (2013.01)

(52) U.S. Cl.
CPC ........... *H04B 10/54* (2013.01); *H04B 10/503* (2013.01)

(58) Field of Classification Search
CPC . H04B 10/54; H04B 10/503; H04B 10/25753
(Continued)

(56) References Cited

U.S. PATENT DOCUMENTS 5,019,769 A * 5/1991 Levinson .............. H01S 5/0683
372/38.1
5,438,579 A * 8/1995 Eda ....................... H01S 5/0687
372/32

(Continued)

FOREIGN PATENT DOCUMENTS

EP    1215832 A2    6/2002
EP    1215832 B1 *    2/2007    ........... H04B 10/506

(Continued)

OTHER PUBLICATIONS

International Search Report for PCT Application No. PCT/JP2021/015979, mailed on Jul. 27, 2021.

(Continued)

*Primary Examiner* — Abbas H Alagheband
(74) *Attorney, Agent, or Firm* — Sughrue Mion, PLLC (57) ABSTRACT

In the present invention, in order to enable stable operation of a single-wave-modulation transmission device, etc., for a longer period, a processing device comprises: a processing unit for performing an adjustment process, which is a process in which the intensity and wavelength of a laser beam from a semiconductor laser used for transmission is adjusted on the basis of the intensity of the laser beam that has not passed through a wavelength filter that restricts the wavelength band of the laser beam and the intensity of a laser beam that has passed through the wavelength filter; and a storage unit for storing the result of the adjustment process.

18 Claims, 8 Drawing Sheets

(58) Field of Classification Search
USPC .......................................................... 398/183
See application file for complete search history.

(56) References Cited

U.S. PATENT DOCUMENTS

| | | | | |
|---|---|---|---|---|
| 5,825,792 | A | * | 10/1998 | Villeneuve .............. H01S 3/139 |
| | | | | 372/28 |
| 2003/0174746 | A1 | * | 9/2003 | Lano ..................... H01S 5/0683 |
| | | | | 372/33 |
| 2019/0363505 | A1 | * | 11/2019 | Kawakita ................ H01S 5/227 |
| 2022/0060261 | A1 | * | 2/2022 | Yamaguchi ......... H04J 14/0212 |

FOREIGN PATENT DOCUMENTS

| | | | | |
|---|---|---|---|---|
| EP | 2234224 | A2 | 9/2010 | |
| EP | 2234224 | B1 * | 9/2018 | ........... H01S 5/0617 |
| JP | 2009-164532 | A | 7/2009 | |
| JP | 2016-021506 | A | 2/2016 | |
| WO | WO-2019160064 | A1 * | 8/2019 | ........... H01S 5/0078 |
| WO | 2020/137821 | A1 | 7/2020 | |
| WO | WO-2022137821 | A1 * | 6/2022 | |

OTHER PUBLICATIONS

English translation of Written opinion for PCT Application No. PCT/JP2021/015979, mailed on Jul. 27, 2021.
Extended European Search Report for EP Application No. 21837396.7, dated on Dec. 7, 2023.

* cited by examiner

PROCESSING DEVICE, TRANSMISSION DEVICE, COMMUNICATION DEVICE, PROCESSING METHOD AND RECORDING MEDIUM

This application is a National Stage Entry of PCT/JP2021/015979 filed on Apr. 20, 2021, which claims priority from Japanese Patent Application 2020-118599 filed on Jul. 9, 2020, the contents of all of which are incorporated herein by reference, in their entirety.

TECHNICAL FIELD

The present invention relates to an optical communication device.

BACKGROUND ART

In an optical submarine device such as a submarine branching device, in which multi-functionalization has recently progressed, a response operation of transmitting response information with respect to information transmitted from an onshore terminal device is demanded. An optical submarine device can transmit, based on the response operation, various types of alarms and various pieces of information such as a monitoring result in the optical submarine device to the onshore terminal device. A method for a response operation is conceivable to include a full-wave modulation method of modulating excitation light of an optical amplifier that optically amplifies a main signal and a single-wave modulation method of using a wavelength of a light source having a single wavelength, such as a semiconductor laser, for a response transmission signal as a response-dedicated wavelength.

Herein, PTL 1 discloses a laser light source control device for stabilizing a light amount of a laser beam emitted from a laser light source.

CITATION LIST

Patent Literature

[PTL 1] Japanese Unexamined Patent Application Publication No. 2016-021506

SUMMARY OF INVENTION

Technical Problem

However, in the full-wave modulation method described in Background Art, during a response of a certain optical submarine device, it is difficult for another optical submarine device to further superimpose a response signal on a signal of the another optical submarine device. Therefore, there is a problem that the number of optical submarine devices capable of responding is limited.

In contract, in the single-wave modulation method, a response signal having a wavelength band different depending on an optical submarine device can be easily used, and therefore limitation to the number of optical submarine devices capable of responding is alleviated, compared with the full-wave modulation method. However, in a semiconductor laser as a light source, output of a laser beam decreases due to degradation. This matter is a problem in an optical submarine device in which output and a wavelength band of a laser beam stable in a long period are demanded.

An object of the present invention is to provide a processing device and the like enabling a transmission device and the like including a semiconductor laser as a transmission light source to stably operate in a longer period.

Solution to Problem

A processing device according to the present invention includes: a processing unit that executes adjustment processing being processing of adjusting, based on an intensity of a laser beam not passing through a wavelength filter that specifies a wavelength band of the laser beam from a semiconductor laser to be used for transmission, and an intensity of the laser beam passing through the wavelength filter, an intensity of the laser beam and a wavelength of the laser beam; and a storage unit that stores a result of the adjustment processing.

Advantageous Effects of Invention

A processing device and the like according to the present invention enable a transmission device and the like including a semiconductor laser as a transmission light source to stably operate in a longer period.

EXAMPLE EMBODIMENT

First Example Embodiment

The present example embodiment is an example embodiment relating to a communication device and the like that adjust, at a predetermined timing, each of an intensity and a laser wavelength of a laser beam as a set value, based on adjustment of laser current and adjustment of an extent of cooling a laser.

[Configuration and Operation]

Figure 1:
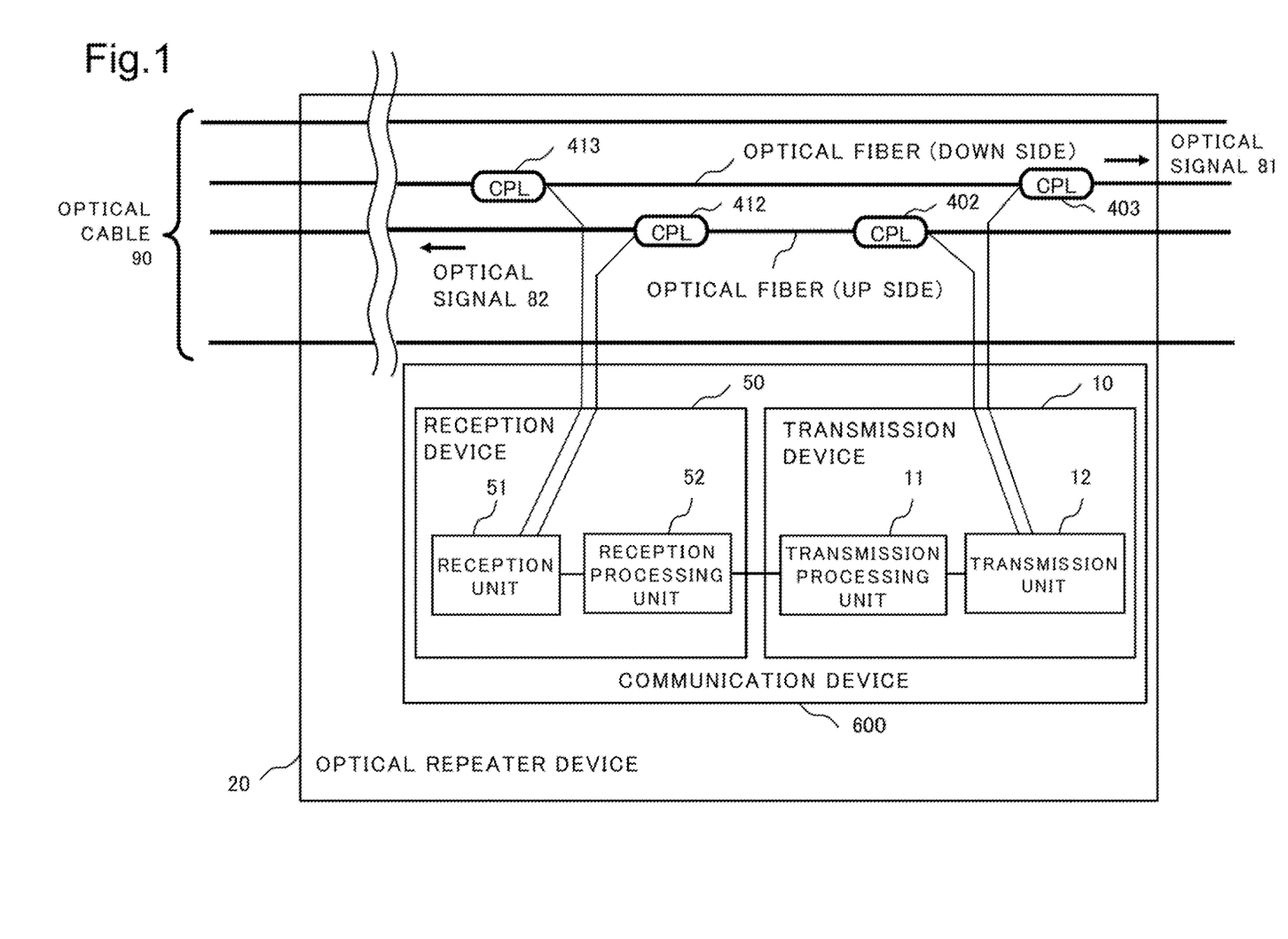
FIG. 1 is a conceptual diagram illustrating a configuration example of a communication device according to the present example embodiment.

FIG. 1 is a conceptual diagram illustrating a configuration of a communication device 600 as an example of the communication device according to the present example embodiment. The communication device 600 is included in an optical repeater device 20 inserted in an optical cable 90. The optical repeater device 20 is, for example, an optical submarine device that repeats/amplifies a signal of an optical filter included in the optical cable 90 and is installed on a sea bottom or in the sea. A configuration of a portion for performing the repeating/amplification is well-known and illustration of the portion is omitted in FIG. 1.

The optical cable 90 is, for example, a submarine cable installed on a sea bottom or in the sea. The optical cable 90 includes optical fibers 91 and 92. The optical cable 90 generally includes optical fibers other than the optical fibers 91 and 92, but illustration of these optical fibers is omitted in FIG. 1. When the optical cable 90 is a submarine cable, the optical fiber 91 is, for example, a down-side optical fiber used for transmitting an optical signal transmitted from an onshore station to another onshore station. The optical fiber 92 is, for example, an up-side optical fiber used for transmitting an optical signal transmitted from another onshore station to the onshore station.

The communication device 600 is a single-wave-modulation communication device described in Background Art. The communication device 600 includes a transmission device 10 and a reception device 50. The reception device 50 includes a reception unit 51 and a reception processing unit 52.

A part of an optical signal 81 branched by a CPL 413 inserted in the optical fiber 91 is input to the reception unit 51. Herein, a CPL is an abbreviation of a coupler. The reception unit 51 acquires, from the input part of the optical signal 81, a signal toward the communication device 600 included in the optical signal 81 and transmits a reception signal being an electric signal of the acquired signal to the reception processing unit 52. The reception unit 51 can discriminate a signal toward the communication device 600 in the optical signal 81, based on a difference in frequency band from a main signal. The reception unit 51 also performs, similarly to the above description, an operation for an optical signal 82 input from a CPL 412.

The reception processing unit 52 is, for example, a computer or a processor. The reception processing unit 52 executes processing for acquisition of information from a reception signal and for a content instructed by the information. It is assumed that information included in a reception signal is, for example, a notification instruction for information (operation status information) representing a predetermined operation status of the optical repeater device 20. In this case, the instruction content is, for example, a transmission instruction to a transmission processing unit 11 with respect to acquisition of operation status information from portions configuring the optical repeater device 20 and the acquired operation status information.

The operations performed by the reception unit 51 and the reception processing unit 52 is a general operation, and therefore description of the details is omitted.

The transmission device 10 is the above-described single-wave-modulation transmission device. The transmission device 10 includes the transmission processing unit 11 and a transmission unit 12. The transmission processing unit 11 is, for example, a computer or a processor. In this case, the transmission processing unit 11 may include the same computer or processor as in the reception processing unit 52.

The transmission processing unit 11 issues a transmission instruction to the transmission unit 12. The transmission instruction includes a difference in whether an optical signal to be overlapped with transmission information is the optical signal 81 or the optical signal 82 and a content of transmission information.

The transmission unit 12 overlaps, in accordance with an instruction from the transmission processing unit 11, the optical signal 81 or the optical signal 82 with an optical signal including transmission information, by using a CPL 403 or a CPL 402, respectively.

The operation performed by the transmission device 10 is a general operation, and therefore description of the details is omitted herein. The transmission unit 12 of the transmission device 10 performs, in addition to the general operation, the following operation.

The transmission unit 12 monitors output (laser output) of a semiconductor laser for generating a transmission optical signal included in the transmission unit 12 and a frequency of a laser beam. As described in Solution to Problem, laser output decreases due to degradation. The transmission unit 12 increases, when laser output decreases to some extent, supply current (laser current) to a semiconductor laser. When laser current increases, a temperature of a light emission unit increases, and as a result, a frequency of a laser beam decreases. The transmission unit 12 reduces the decrease in a frequency of a laser beam, by cooling a laser and decreasing a laser temperature. Hereinafter, a configuration of the transmission unit 12 performing the operation and a specific example of the operation are described.

Figure 2:
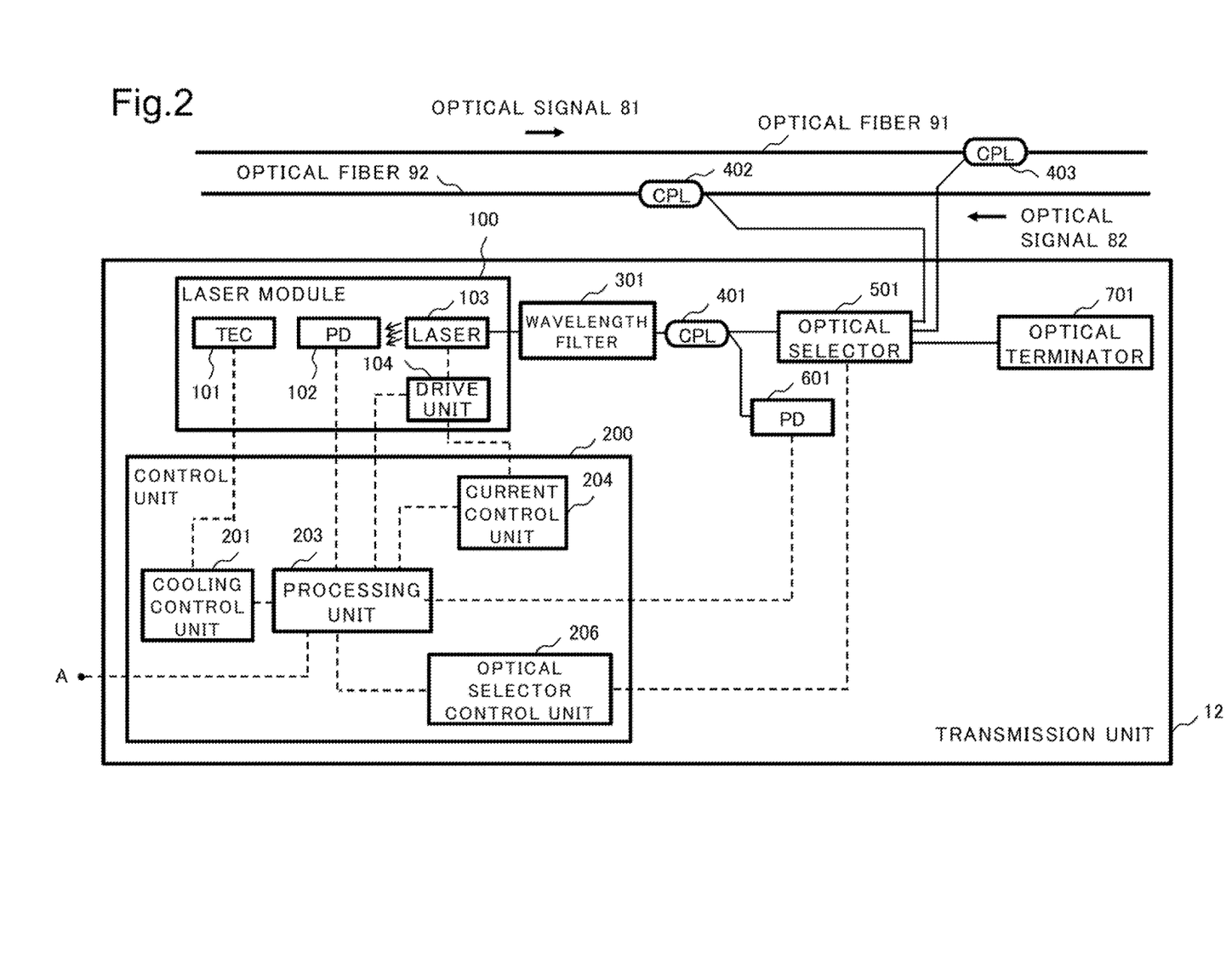
FIG. 2 is a conceptual diagram illustrating a first configuration example of a transmission unit.

FIG. 2 is a conceptual diagram illustrating a configuration example of the transmission unit 12 in FIG. 1. The transmission unit 12 includes a laser module 100, a control unit 200, a wavelength filter 301, a CPL 401, an optical selector 501, a PD 601, and an optical terminator 701. Herein, a PD is an abbreviation of a photo diode. A signal path illustrated with a solid line in the figure is a path of an optical signal (laser signal). A path of an optical signal includes an optical fiber. In contrast, a path illustrated with a dashed line in the figure is a path of an electric signal. A path of an electric signal includes a conductive wire.

The laser module 100 incudes a TEC 101, a PD 102, a laser 103, and a drive unit 104. Herein, a TEC is an abbreviation of a thermoelectric cooler. The drive unit 104 sets, in accordance with an instruction from a current control unit 204, a value of drive current (laser current) for the laser 103. Thereby, the drive unit 104 supplies, to the laser 103, an amplitude-modulated drive current relevant to an amplitude modulation signal input from a processing unit 203.

The laser 103 is a semiconductor laser and is, for example, a distributed feedback (DFB) laser. The laser 103 is driven by an amplitude-modulated current signal from the drive unit 104 and outputs an amplitude-modulated optical signal (laser signal) relevant to the current signal. The optical signal is caused to enter the wavelength filter 301. The wavelength filter 301 limits passing laser beams to a laser beam having a wavelength band used at a time of transmission and thereby, specifies a wavelength band of a laser beam after passage.

The PD 102 outputs, to the processing unit 203, a first voltage value representing a voltage according to an intensity of an optical signal incident from the laser 103. While representing an output voltage from the PD 102, the first voltage value is not always the output voltage itself but is, for example, a value acquired by multiplying the output voltage by a predetermined coefficient. The TEC 101 cools the laser 103, based on a control signal transmitted from a cooling control unit 201. The TEC 101 is configured, for example, by including a Peltier element.

A part of a laser beam transmitted through the wavelength filter 301 is separated by the CPL 401 and is input to the PD 601. A remaining laser beam is caused to enter the optical selector 501. The PD 601 inputs, to the processing unit 203, a second voltage value representing an intensity of the incident laser beam in which a passage wavelength band is limited by the wavelength filter 301. While representing an output voltage from the PD 601, the second voltage value is not always the output voltage itself but is, for example, a value acquired by multiplying the output voltage by a predetermined coefficient.

The optical selector 501 switches, based on a control signal from an optical selector control unit 206, a transmission destination of a laser beam incident from the CPL 401 to any one of the optical terminator 701, the CPL 402, and the CPL 403.

A laser beam incident to the optical terminator 701 is terminated by the optical terminator 701 in such a way as not to generate return light. Light incident to the CPL 402 is overlapped with the optical signal 82. The overlapped optical signal 82 is transmitted leftward through the optical fiber 92. In contrast, light incident to the CPL 403 is overlapped with the optical signal 81. The overlapped optical signal 81 is transmitted rightward through the optical fiber 91.

The control unit 200 includes, for example, a computer or a processor. The computer or the processor may be common to a computer or a processor included in the transmission processing unit 11 and the reception processing unit 52 in FIG. 1. The control unit 200 includes the processing unit 203, the cooling control unit 201, the current control unit 204, and the optical selector control unit 206.

The cooling control unit 201 controls, in accordance with an instruction from the processing unit 203, a degree of cooling of the laser 103 based on the TEC 101. The current control unit 204 controls, in accordance with an instruction from the processing unit 203, a current value of a current signal input to the laser 103 by the drive unit 104. The optical selector control unit 206 controls, in accordance with an instruction from the processing unit 203, a switching destination switched by the optical selector 501 to any one of the optical terminator 701, the CPL 402, and the CPL 403.

Various pieces of information relating to transmission are input, via a terminal A, to the processing unit 203 from the transmission processing unit 11 in FIG. 1. These pieces of information include at least transmission instruction information for instructing transmission of predetermined information and adjustment instruction information for instructing adjustment of laser output and a laser wavelength of the laser 103.

The processing unit 203 transmits, when receiving transmission of transmission instruction information from the transmission processing unit 11, an amplitude modulation signal representing transmission information to the drive unit 104 and causes the drive unit 104 to supply amplitude-modulated laser current to the laser 103. The processing unit 203 specifies, for the current control unit 204, a laser current value at that time. The processing unit 203 derives the laser current value, based on processing, to be described later, executed when receiving transmission of adjustment instruction information, and stores the derived value in a storage unit which is not illustrated.

The processing unit 203 operates, when receiving transmission of transmission instruction information or as necessary, the cooling control unit 201 in such a way as to cause the TEC 101 to cool the laser 103. The processing unit 203 specifies, for the cooling control unit 201, a degree of cooling at a time of the cooling. The processing unit 203 derives information representing a degree of cooling at that time, based on processing, to be described below, executed when receiving transmission of adjustment instruction information, and stores the derived value in a storage unit which is not illustrated.

The processing unit 203 executes, when receiving transmission of the above-described adjustment instruction information, based on adjustment of laser current and adjustment of a degree of cooling of the laser 103, adjustment processing of adjusting each of an intensity and a laser wavelength of a laser beam of the laser 103 as a set value set as a value to be used at a time of transmission. The processing unit 203 stores, in a storage unit which is not illustrated, information representing a laser current value and a degree of cooling adjusted based on the adjustment processing.

Figure 3:
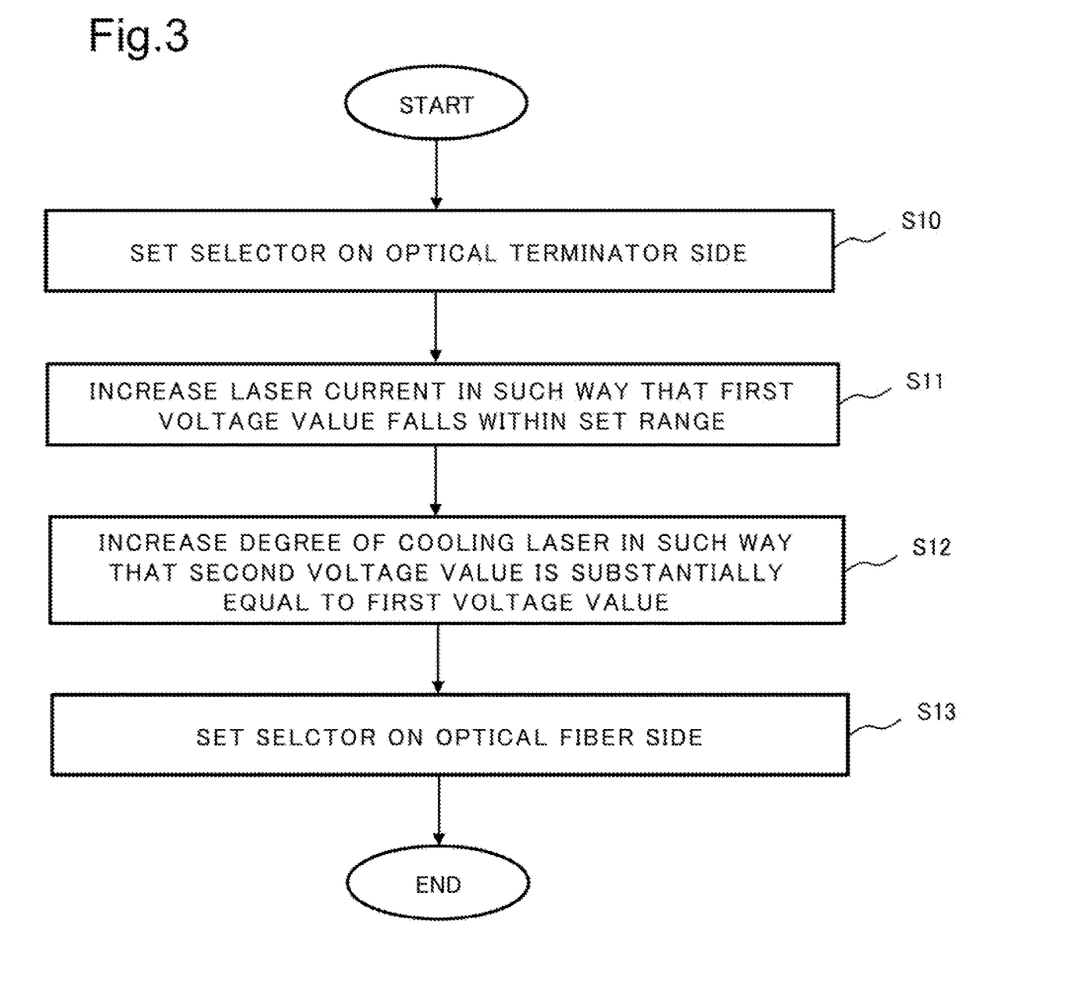
FIG. 3 is a conceptual diagram illustrating a first specific example of adjustment processing executed by a processing unit.

FIG. 3 is a conceptual diagram illustrating a first specific example of processing executed by the processing unit 203. The processing unit 203 receives transmission of the above-described adjustment instruction information and starts processing in FIG. 3. In a state of the start, it is assumed that a laser wavelength falls within a set range (set value neighborhood). In this case, a ratio of a laser beam passing through the wavelength filter 301 falls within a maximum neighborhood. In order to cause, as a relation, a first voltage value and a second voltage value to be substantially equal to each other, a coefficient to be multiplied with output from the PD 102 or output from the PD 601 is adjusted.

The processing unit 203 first sets, as processing in S10, a connection destination of the optical selector 501 as the optical terminator 701. The reason is that a laser beam used for adjustment is prevented from being transmitted to the optical fiber 91 or 92.

The processing unit 203 increases, as processing in S11, a laser current value supplied to the laser 103 from an initial state in such a way that a first voltage value falls within a set range and stores an increased laser current value. However, the processing unit 203 maintains, when in an initial state, the first voltage value already falls within the set range, a laser current value in the initial state. When the processing unit 203 increases a laser current value, power consumption of the laser 103 increases, and therefore a temperature in a light-emitting-unit vicinity of the laser 103 increases. In this case, due to thermal expansion of the light-emitting-unit vicinity of the laser 103, a laser wavelength is shifted to a long wavelength side. Therefore, a second voltage value is smaller than a first voltage value.

Next, the processing unit 203 increases, as processing in S12, a degree of cooling of the laser 103 based on the TEC 101 in such a way that the second voltage value and the first voltage value are equal to each other. The processing unit 203 does not perform the increase when the first voltage value is already substantially equal to the second voltage value. By doing these matters, a laser wavelength falls within a range set as a value used at a time of transmission.

The processing unit 203 disconnects, as processing in S13, the connection destination of the optical selector 501 from the optical terminator 701 and causes the optical fiber 91 or 92 to be selectable. The processing unit 203 terminates processing in FIG. 3.

In processing in FIG. 3, in an initial state, it is assumed that a degree of cooling of the laser 103 based on the TEC is adjusted in such a way that a first voltage value is equal to a second voltage value. However, in an initial installation-stage of the optical repeater device 20 in FIG. 1, such adjustment may not always be performed. Alternatively, it is conceivable that degradation may not always progress ideally. In such a case, processing in FIG. 4 may be executed.

Figure 4:
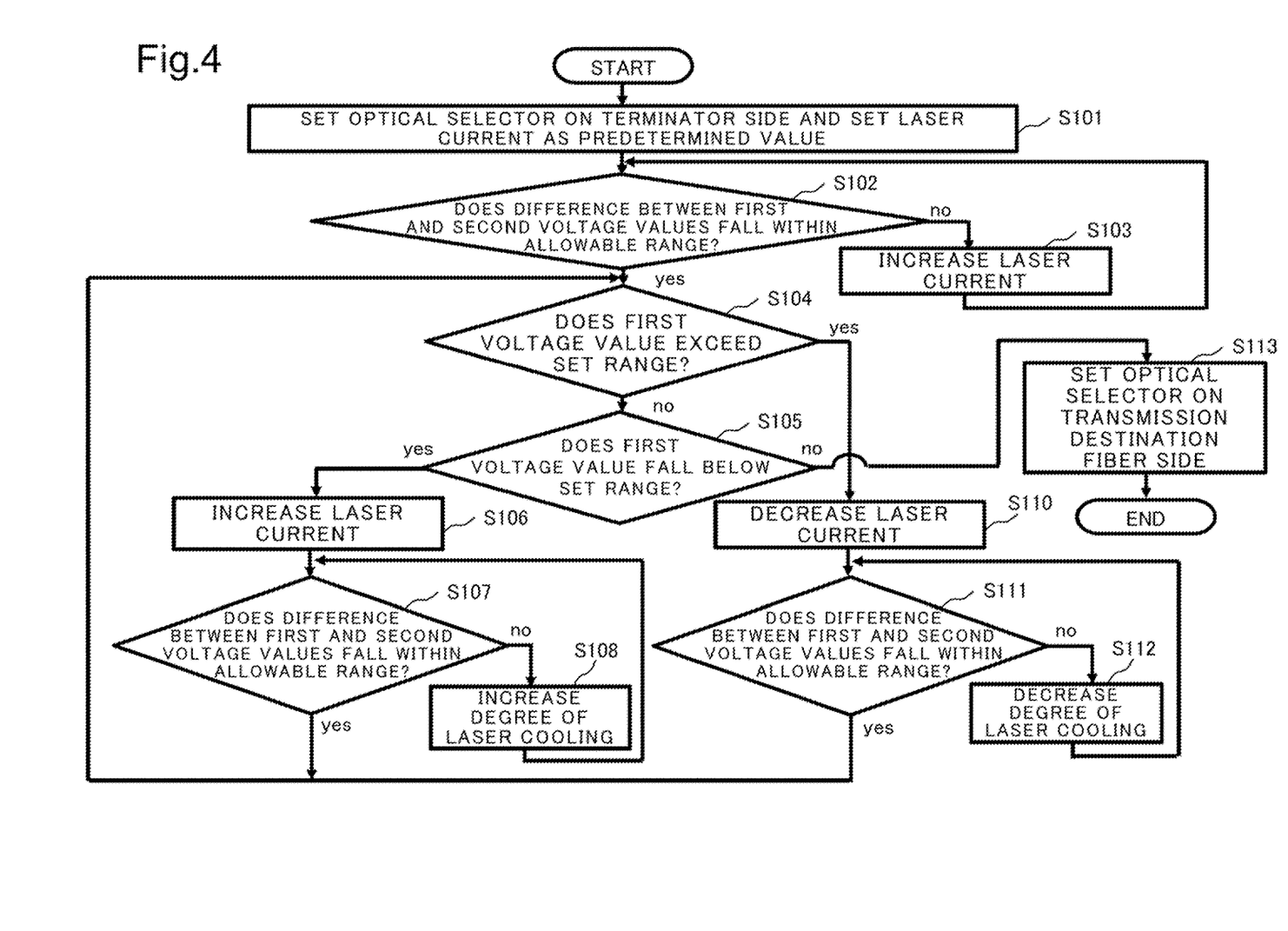
FIG. 4 is a conceptual diagram illustrating a second specific example of adjustment processing executed by a processing unit.

FIG. 4 is a conceptual diagram illustrating a second specific example of adjustment processing executed by the processing unit 203. Processing in FIG. 4 is processing of first adjusting a laser current value in such a way that a first voltage value becomes a second voltage value while the laser 103 is not cooled by the TEC 101 (S101 to S103) and thereafter, adjusting a degree of cooling of the laser 103 based on the TEC 101 in such a way that the first voltage value becomes the second voltage value while laser current is adjusted.

The processing unit 203 starts processing in FIG. 4, for example, based on input of start information from an outside. The processing unit 203 first sets, as processing in S101, a connection destination of the optical selector 501 as the optical terminator 701. The processing unit 203 further sets a current value of laser current supplied to the laser 103 by the drive unit 104. The processing unit 203 sets the current value at that time as a small value, compared with a current value at a time of transmission, while the laser 103 emits light. A laser wavelength of a laser beam from the laser 103 based on a small current value has a short value, compared with a laser wavelength at a time of transmission. The reason is that laser current is low, and therefore a temperature of a light emitting unit of the laser 103 is low, compared with a time of transmission. A laser wavelength is shorter than a set value, and therefore a laser beam is attenuated by the wavelength filter 301. Therefore, output from the PD 601 for a laser beam after passing through the wavelength filter 301 is smaller than output from the PD 102 for a laser beam not passing through the wavelength filter 301.

In order to find, from this state, laser current achieving a laser wavelength to be used for transmission, the processing unit 203 executes processing in S102 and S103.

The processing unit 203 first determines, as processing in S102, whether a difference between a first voltage value and a second voltage value is sufficiently small (approximately zero) and falls within an allowable range. A voltage value representing the allowable range is previously determined. The processing unit 203 executes processing in S104 when a determination result based on processing in S102 is yes. In contrast, the processing unit 203 executes processing in S103 when a determination result based on processing in S102 is no.

The processing unit 203 increases, when executing processing in S103, laser current by a current ΔI as the same processing. The current ΔI is previously determined and is set as a sufficiently small value in such a way that there is a case where no in S102 and S103 are repeated and thereby, a determination result in S102 becomes yes. The processing unit 203 executes again processing in S102.

Thereafter, the processing unit 203 repeats no in S102 and S103 and laser current increases by a step of a current ΔI, and thereby a laser wavelength is gradually shifted to a long wavelength side, whereby a determination result in S102 achieves yes. This mater indicates that the laser 103 emits a laser beam of a laser wavelength to be used for transmission. However, in this stage, laser output from the laser 103 does not always have a value to be used for transmission. Therefore, the processing unit 203 adjusts, when laser output is shifted from a value to be used for transmission, the value and further executes processing in S104 and the following steps of adjusting the shifted laser wavelength, based on adjustment of laser output.

The processing unit 203 determines, as processing in S104, whether a first voltage value exceeds a previously-determined set range, assuming to be used for transmission. The processing unit 203 executes processing in S110 when a determination result based on processing in S104 is yes. In contrast, the processing unit 203 executes processing in S105 when a determination result based on processing in S104 is no.

The processing unit 203 determines, when executing processing in S105, whether a first voltage value falls below the set range as the same processing. The processing unit 203 executes processing in S106 when a determination result based on processing in S105 is yes. In contrast, the processing unit 203 executes processing in S113 when a determination result based on processing in S105 is no.

The processing unit 203 causes, when executing processing in S106, the current control unit 204 to increase laser current by a current ΔI as the same processing. The processing unit 203 determines, as processing in S107, whether a difference between a first voltage value and a second voltage value falls within the above-described allowable range. The processing unit 203 executes processing in S104 when a determination result based on processing in S107 is yes. In contrast, the processing unit 203 executes processing in S108 when a determination result based on processing in S107 is no.

The processing unit 203 causes, when executing processing in S108, the cooling control unit 201 to increase a degree of cooling of the laser 103 based on the TEC 101 by ΔC as the same processing. When the TFC 101 is a Peltier element, a degree ΔC is set by an increment of current supplied to the Peltier element. A degree ΔC is set as a sufficiently small value in such a way that no in S107 and S108 are repeated and thereby, a determination result in S107 becomes yes.

The processing unit 203 repeats no in S107 and S108 and thereby, acquires yes as a determination result in S107. The processing unit 203 executes again processing in S104.

The processing unit 203 causes, when executing processing in S110, the current control unit 204 to decrease laser current by a current ΔI as the same processing. The processing unit 203 determines, as processing in S111, whether a difference between a first voltage value and a second voltage value falls within the above-described allowable range. The processing unit 203 executes processing in S104 when a determination result based on processing in S11*l* is yes. In contrast, the processing unit 203 executes processing in S112 when a determination result based on processing in S111 is no.

The processing unit 203 causes, when executing processing in S112, the cooling control unit 201 to decrease a degree of cooling of the laser 103 based on the TEC 101 by the above-described degree ΔC as the same processing.

The processing unit 203 repeats no in S11*l* and S112 and thereby, acquires yes as a determination result in S111. The processing unit 203 executes again processing in S104.

The processing unit 203 causes, when executing processing in S113, the optical selector control unit 206 to set a connection destination of the optical selector 501 in such a way as to be either of the CPL 402 and 402 as the same processing.

The processing unit 203 terminates processing in FIG. 4.

The processing unit 203 causes a storage unit which is not illustrated to store pieces of information representing a laser current value adjusted based on processing in FIG. 4 and a degree of cooling of the laser 103. The processing unit 203 causes, at a time of transmission performed after processing in FIG. 4, the current control unit 204 and the cooling control unit 201 to perform control based on these pieces of information.

In the above description, an example in which a transmission device transmits a transmission optical signal to two optical fibers has been described. However, the transmission device may transmit an optical signal to three or more optical fibers. A matter that an optical signal is transmitted to three or more optical fibers is made possible by setting the number of switching destinations of an optical selector to be equal to or more than four (one destination is an optical terminator). Alternatively, an optical selector may be configured in a multiple-stage manner.

Advantageous Effect

The transmission device and the like according to the present example embodiment adjusts laser current and adjusts a degree of cooling of a laser at a predetermined timing and thereby, adjusts each of an intensity and a laser wavelength of a laser beam as a set value. Therefore, the transmission device enables continuous use of a laser in which an intensity of a laser beam decreases due to degradation of a laser and the like. Thereby, the transmission device and the like enable a stable operation in a longer period.

Second Example Embodiment

The present example embodiment is an example embodiment relating to a communication device that transmits an optical signal in which a laser beam is intensity-modulated by driving an optical attenuator.
[Configuration and Operation]
A configuration example of a communication device according to the present example embodiment is the communication device 600 illustrated in FIG. 1. The communication device 600 according to the present example embodiment is different from the communication device 600 according to the first example embodiment in the following point. Hereinafter, a difference of the communication device 600 according to the present example embodiment from the first example embodiment is mainly described.

Figure 5:
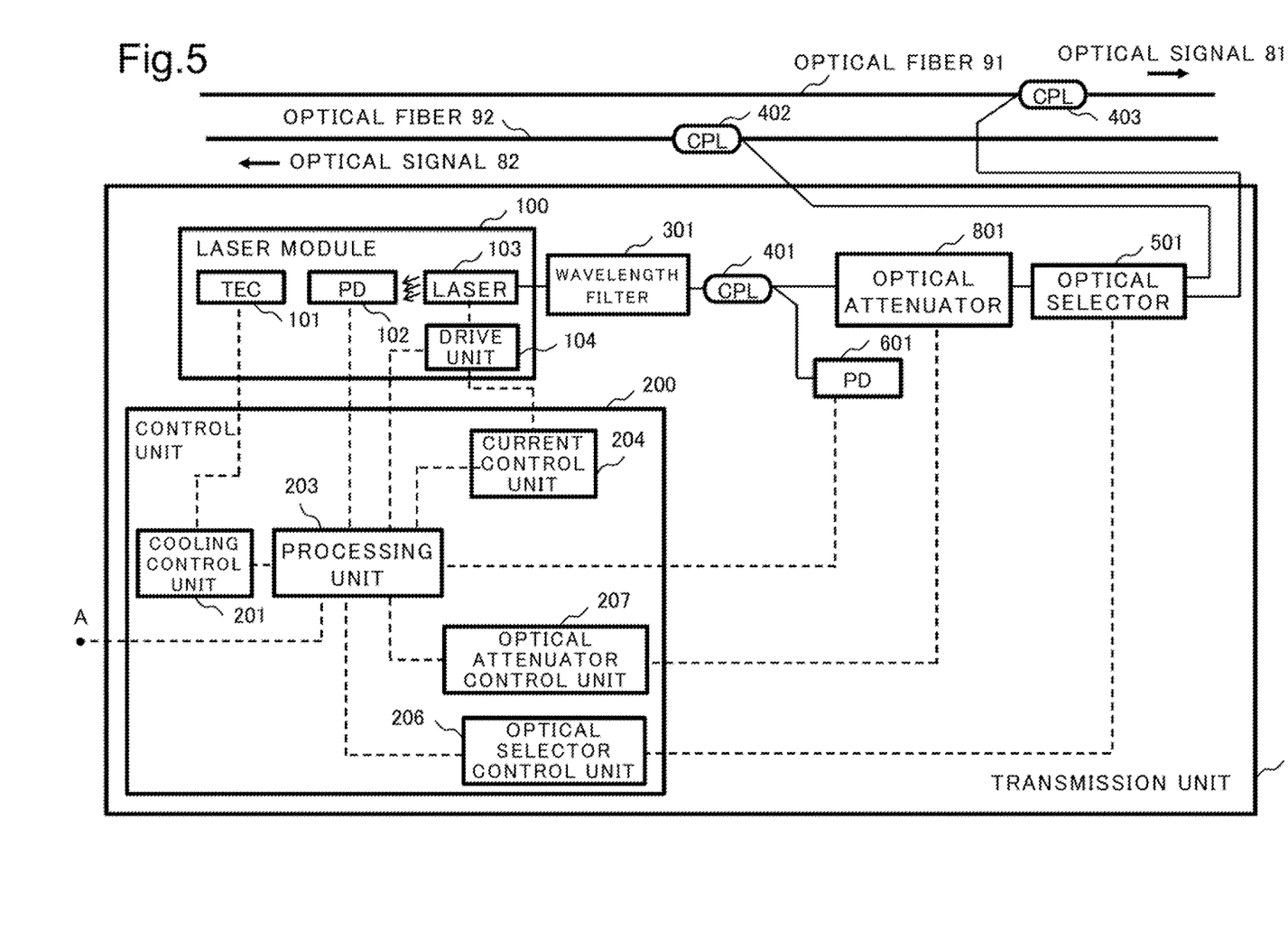
FIG. 5 is a conceptual diagram illustrating a second configuration example of a transmission unit.

FIG. 5 is a conceptual diagram illustrating a configuration example of the transmission unit 12 included in the communication device 600 according to the present example embodiment. The transmission unit 12 in FIG. 5 includes, in addition to the configuration included in the transmission unit 12 of FIG. 2, an optical attenuator 801 between the CPL 401 and the optical selector 501. The control unit 200 in FIG. 5 includes, in addition to the configuration included in the control unit 200 of FIG. 2, an optical attenuator control unit 207. The transmission unit 12 in FIG. 5 does not include the optical terminator 701 in FIG. 2.

An operation performed by the transmission unit 12 in FIG. 5 is different from the transmission unit 12 in FIG. 2 as described below.

The drive unit 104 receives an instruction from the processing unit 203 and supplies, to the laser 103, not intensity-modulated laser current but direct laser current.

The processing unit 203 transmits, when receiving transmission instruction information as described in the description of FIG. 2, an amplitude-modulated signal to the optical attenuator control unit 207. The optical attenuator control unit 207 drives, in accordance with the amplitude-modulated signal, an attenuation amount based on the optical attenuator 801 and amplitude-modulates an input laser beam. The amplitude-modulated laser beam is caused to enter the optical selector 501.

The processing unit 203 causes, before transmission of an amplitude-modulated signal to the optical attenuator control unit 207, the optical selector control unit 206 to switch a connection destination of the optical selector 501 between the CPL 402 and the CPL 403.

As described above, the processing unit 203 executes transmission processing for transmission information.

The processing unit 203 first causes, when receiving transmission of adjustment instruction information as described in FIG. 2, the optical attenuator control unit 207 to cut off (maximum attenuation) a laser beam based on the optical attenuator 801. The processing unit 203 executes adjustment processing as described according to the first example embodiment. Thereby, the processing unit 203 exhibits an advantageous effect, similarly to the first example embodiment.

Advantageous Effect

The communication device according to the second example embodiment exhibits an advantageous effect, similarly to the communication device according to the first example embodiment. In addition to the above advantageous effect, the communication device does not need to amplitude-modulate laser current, based on a drive unit. When laser current is amplitude-modulated, a laser wavelength is subjected to an influence of a current change resulting from the amplitude modulation. Therefore, it is difficult to set an amplitude of amplitude modulation of laser current to a sufficiently large extent. In contrast, the communication device does not amplitude-modulate laser current and therefore, can set an amplitude of a laser signal to a larger extent.

Third Example Embodiment

The present example embodiment is an example embodiment relating to a communication device that adjusts an intensity of a laser beams according to a degree of attenuation of a laser beam based on an optical attenuator.
[Configuration and Operation]
A configuration example of the communication device according to the present example embodiment is the communication device 600 illustrated in FIG. 1. The communication device 600 according to the present example embodiment is different from the communication device 600 according to the first example embodiment in the following point. Hereinafter, a difference of the communication device 600 according to the present example embodiment from the first example embodiment is mainly described.

Figure 6:
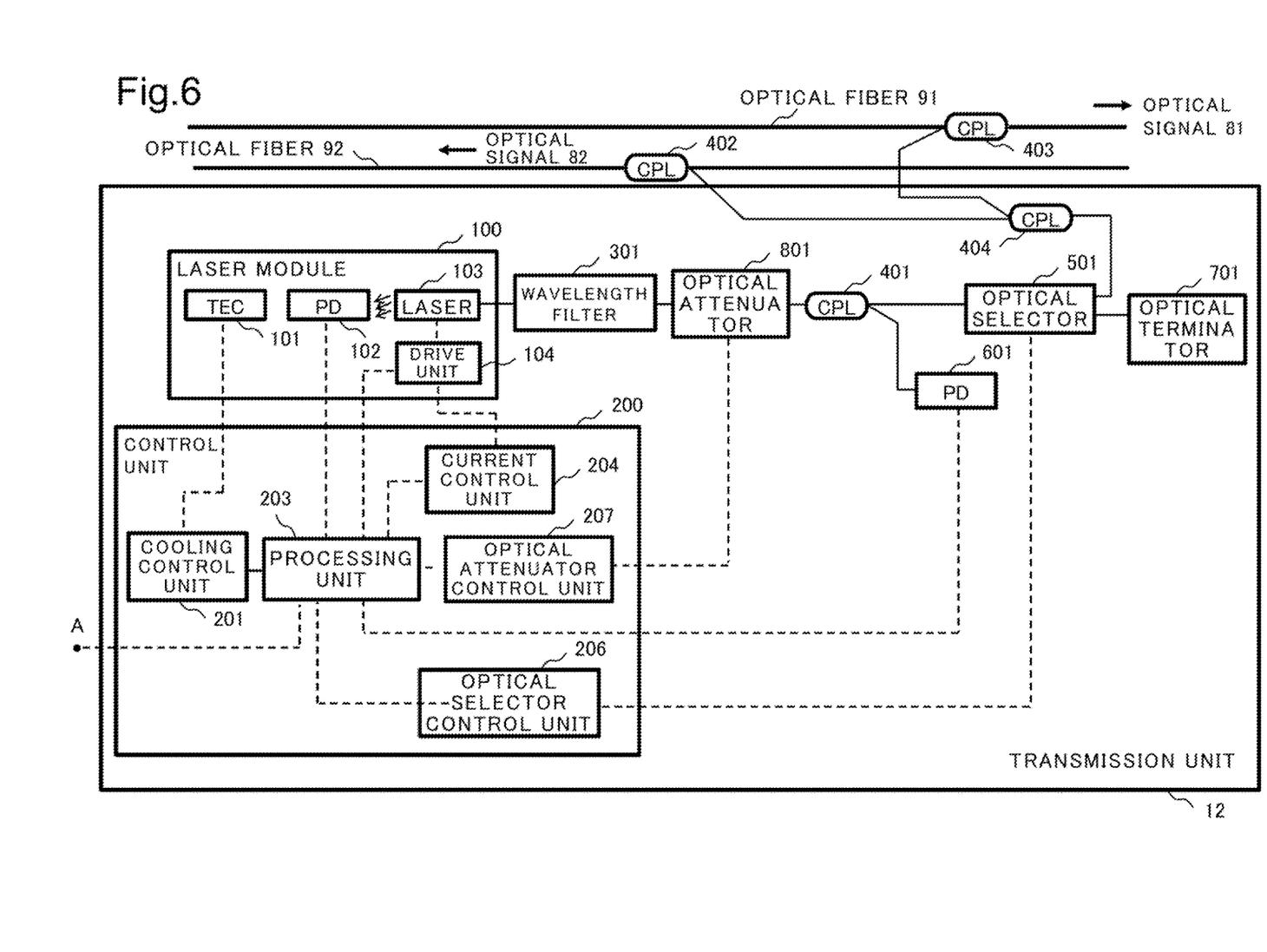
FIG. 6 is a conceptual diagram illustrating a third configuration example of a transmission unit.

FIG. 6 is a conceptual diagram illustrating a configuration example of the transmission unit 12 included in the communication device 600 according to the present example embodiment. The transmission unit 12 includes, in addition to the configuration included in the transmission unit 12 of FIG. 2, the optical attenuator 801 between the wavelength filter 301 and the CPL 401. The control unit 200 includes, in addition to the configuration included in the control unit 200 of FIG. 2, the optical attenuator control unit 207.

An operation performed by the transmission unit 12 in FIG. 6 is different from the operation in FIG. 2 in the following point.

The transmission unit 12 adjusts, based on attenuation of a laser signal based on the optical attenuator 801, an intensity of a laser signal to be overlapped with the optical fiber 91 or 92.

The processing unit 203 previously causes the optical attenuator control unit 207 to set an attenuation amount of a laser signal based on the optical attenuator 801 as a predetermined value. The processing unit 203 causes the current control unit 204 to adjust, based on the attenuation amount, a laser current value in such a way that a second voltage value from the PD 601 achieves an intensity of a laser beam at a time of transmission. Based on the above-described setting and adjustment, a first voltage value from the PD 102 and a second voltage value from the PD 601 are substantially equal to each other.

Thereafter, due to degradation of the laser 103, an intensity of a laser beam decreases.

The processing unit 203 causes, when receiving transmission of transmission instruction information as described in the description of FIG. 2, the optical attenuator control unit 207 to adjust an attenuation amount of a laser signal based on the optical attenuator 801. The adjustment is performed in such a way that a first voltage value from the PD 102 and a second voltage value from the PD 601 are, for example, substantially equal to each other. At that time, the processing unit 203 does not modify laser current. Laser current is not changed, and therefore a laser wavelength is not changed.

Thereafter, it is assumed that due to degradation of the laser 103, an intensity of a laser beam is further decreased and an attenuation amount based on the optical attenuator 801 is minimized. In this case, the processing unit 203 executes adjustment processing according to the first example embodiment.

The processing unit 203 may cause, as in the case according to the second example embodiment, the optical attenuator control unit 207 to amplitude-modulate an attenuation amount based on the optical attenuator 801 and generate a transmission signal. In this case, the processing unit 203 does not cause the drive unit 104 to supply amplitude-modulated laser current to the laser 103.

The processing unit 203 may execute, even when an attenuation amount based on the optical attenuator 801 is not minimized, adjustment processing according to the first example embodiment. In this case, the processing unit 203 can adjust a shift of a laser wavelength due to a cause other than an increase in a laser current value.

Advantageous Effect

The communication device according to the present example embodiment decreases, before adjustment processing executed by the communication device according to the first example embodiment, an attenuation amount based on an optical attenuator and thereby, adjusts an intensity of a laser beam used for transmission. Therefore, the communication device enables continuous use of a laser in a longer period.

Fourth Example Embodiment

The present example embodiment is an example embodiment relating to a communication device in which a laser module has a redundant configuration.

[Configuration and Operation]

A configuration example of the communication device according to the present example embodiment is the communication device 600 illustrated in FIG. 1. The communication device 600 according to the present example embodiment is different from the communication device 600 according to the first example embodiment in the following point. Hereinafter, a difference of the communication device 600 according to the present example embodiment from the first example embodiment is mainly described.

Figure 7:
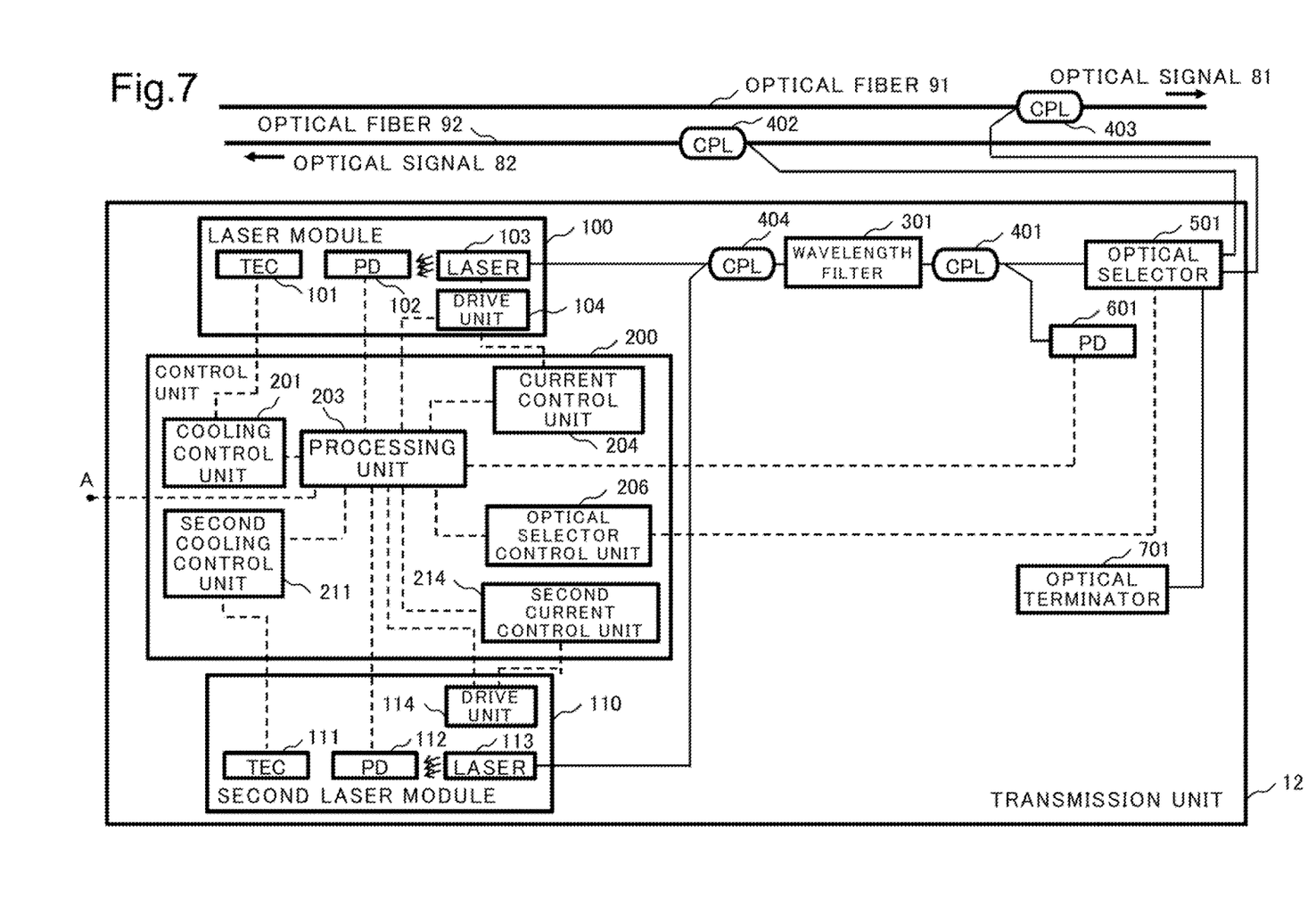
FIG. 7 is a conceptual diagram illustrating a fourth configuration example of a transmission unit.

FIG. 7 is a conceptual diagram illustrating a configuration example of the transmission unit 12 included in the communication device 600 according to the present example embodiment. The transmission unit 12 in FIG. 7 includes, in addition to the configuration included in the transmission unit 12 of FIG. 2, a second laser module 110. The second laser module 110 includes a TEC 111, a PD 112, a laser 113, and a drive unit 114. These units are relevant to components included in the laser module 100. The transmission unit 12 in FIG. 7 further includes a CPL 404.

The control unit 200 in FIG. 7 includes, in addition to the configuration included in the control unit 200 of FIG. 2, a second cooling control unit 211 and a second current control unit 214. These units perform an operation similar to the cooling control unit 201 and the current control unit 204 except that a control target includes the TEC 111 and the drive unit 114.

The processing unit 203 first executes, when executing adjustment processing as described according to the first example embodiment, adjustment processing for the laser 103 based on a configuration common to FIG. 2. When degradation of the laser 103 progresses, at a certain time point, adjustment processing is not completed for the laser module 100, due to limitation to cooling of the laser 103 based on the TFC 101, limitation to an increase in laser current supplied to the laser 103, or the like. The reason is that, for example, in processing of FIG. 4, a difference between a first voltage value and a second voltage value does not fall within an allowable range or a first voltage value does not fall within a set range, based on adjustment of laser current or a degree of cooling of the laser 103.

In this case, the processing unit 203 switches a laser module used for transmission from the laser module 100 to the second laser module 110. The processing unit 203 executes adjustment processing for the second laser module 110 and executes transmission processing based on the second laser module 110, by using laser current and a degree of cooling determined based on adjustment processing.

Instead of the CPL 404 in FIG. 7, an optical selector that performs switching between the laser 103 and the laser 113 when viewed from the wavelength filter 301 may be used. In this case, the control unit 200 includes a selector control unit that control the selector. The processing unit 203 causes the selector control unit to control the selector.

The transmission unit 12 may include a combination of three or more laser modules, a cooling control unit that controls the laser modules, and a current control unit.

Advantageous Effect

The communication device according to the present example embodiment includes a plurality of transmission laser modules. The communication device adjusts, for one laser module, when adjustment of a laser output intensity and a laser wavelength reaches a limit, a laser output intensity and a laser wavelength for another laser module. The communication device performs transmission by using the laser module. Therefore, the communication device enables an operation in a longer period.

Figure 8:
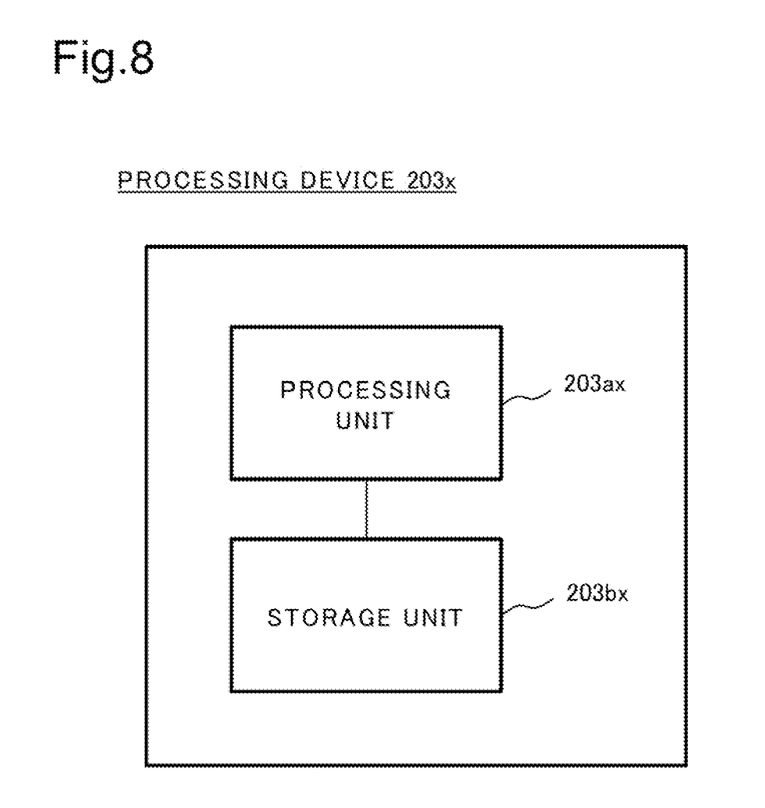
FIG. 8 is a block diagram illustrating a minimum configuration of a processing device according to an example embodiment.

FIG. 8 is a block diagram illustrating a configuration of a processing device 203x being a minimum configuration of a processing device according to the example embodiments. The processing device 203x includes a processing unit 203ax and a storage unit 203bx. The processing unit 2003ax executes adjustment processing being processing of adjusting, based on an intensity of a laser beam not passing through a wavelength filter and an intensity of a laser beam passing through the wavelength filter, an intensity of the laser beam and a wavelength of the laser beam. The wavelength filter specifies a wavelength band of a laser beam from a semiconductor laser used for transmission. The storage unit 203bx stores a result of the adjustment processing.

The processing device 203x executes processing of adjusting an intensity of the laser beam and a wavelength of the laser beam and therefore, can continue using the semiconductor laser even when an intensity or a wavelength of the laser beam is shifted. Therefore, the processing device 203x can elongate a period in which the semiconductor laser is usable. Therefore, the processing device 203x enables a transmission device and the like including a semiconductor laser as a transmission light source to stably operate in a longer period.

Therefore, the processing device 203x exhibits, based on the configuration, an advantageous effect described in Advantageous Effects of Invention.

While example embodiments according to the present invention have been described, the present invention is not limited to the example embodiments, and further changes, substitutions, and adjustments may be made without departing from the fundamental technical spirit of the present invention. For example, a configuration of elements illustrated in each of drawings is one example for assisting understanding of the present invention without limitation to the configurations illustrated in these drawings.

The whole or part of the example embodiments disclosed above can be described as, but not limited to, the following supplementary notes.

Supplementary Note 1

A processing device including:
a processing unit that executes adjustment processing being processing of adjusting, based on an intensity of a laser beam not passing through a wavelength filter that specifies a wavelength band of a laser beam from a semiconductor laser to be used for transmission and an intensity of the laser beam passing through the wavelength filter, an intensity of the laser beam and a wavelength of the laser beam; and
a storage unit that stores a result of the adjustment processing.

Supplementary Note 2

The processing device according to supplementary note 1, wherein the processing unit executes the adjustment processing in such a way that both of an intensity of the laser beam and a wavelength of the laser beam fall within a predetermined range.

Supplementary Note 3

The processing device according to supplementary note 2, wherein the predetermined range is a range to be used for transmission based on the laser beam.

Supplementary Note 4

The processing device according to any one of supplementary notes 1 to 3, wherein the result includes a value of laser current to be used for driving the semiconductor laser and a degree of cooling of the semiconductor laser.

Supplementary Note 5

The processing device according to any one of supplementary notes 1 to 3, wherein the processing unit executes the adjustment processing in such a way that an intensity of the laser beam not passing through the wavelength filter and an intensity of the laser beam passing through the wavelength filter establish a set relation.

Supplementary Note 6

The processing device according to supplementary note 5, wherein, in the set relation, a ratio of the laser beam passing through the wavelength filter is substantially maximum.

Supplementary Note 7

The processing device according to any one of supplementary notes 1 to 6, wherein the processing unit cuts off or attenuates, at a time of the adjustment processing, passage of the laser beam to an outside.

Supplementary Note 8

The processing device according to supplementary note 7, wherein the processing unit performs the cutting-off or the attenuation by using an optical attenuator.

Supplementary Note 9

The processing device according to any one of supplementary notes 1 to 8, wherein, based on the result, the processing unit executes transmission processing relating to transmission based on the laser beam.

Supplementary Note 10

The processing device according to supplementary note 9, wherein the transmission processing includes processing of amplitude-modulating the laser beam as a transmission signal for the transmission.

Supplementary Note 11

The processing device according to supplementary note 10, wherein the amplitude-modulation processing is executed by processing of modulating a degree of attenuation of the laser beam by an optical attenuator.

Supplementary Note 12

The processing device according to any one of supplementary notes 1 to 11, wherein the processing unit executes the adjustment processing for a plurality of the semiconductor lasers.

Supplementary Note 13

The processing device according to supplementary note 12, wherein the processing unit executes, when attempting the adjustment processing for one of the semiconductor lasers and not completing the adjustment processing, the adjustment processing for another of the semiconductor lasers.

Supplementary Note 14

The processing device according to any one of supplementary notes 1 to 13, wherein the transmission is performed to an optical fiber.

Supplementary Note 15

The processing device according to supplementary note 14, wherein the transmission is performed to a plurality of optical fibers.

Supplementary Note 16

The processing device according to supplementary note 15, wherein the optical fiber includes an optical fiber to be used for optical communication toward a certain direction and an optical fiber to be used for optical communication toward an opposite direction.

Supplementary Note 17

The processing device according to any one of supplementary notes 14 to 16, wherein the optical fiber is included in an optical cable.

Supplementary Note 18

The processing device according to supplementary note 17, wherein the optical cable is a submarine cable.

Supplementary Note 19

The processing device according to any one of supplementary notes 1 to 18, being included in an optical submarine device.

Supplementary Note 20

A transmission device including the processing device according to any one of supplementary notes 1 to 19 and the semiconductor laser.

Supplementary Note 21

A communication device including the transmission device according to supplementary note 20 and a reception device that receives an optical signal transmitted by another transmission device.

Supplementary Note 22

A processing method including:
adjusting, based on an intensity of a laser beam not passing through a wavelength filter that specifies a wavelength band of a laser beam from a semiconductor laser to be used for transmission and an intensity of the laser beam passing through the wavelength filter, an intensity of the laser beam and a wavelength of the laser beam; and
storing a result of the adjustment.

Supplementary Note 23

A processing program causing a computer to execute:
adjustment processing being processing of adjusting, based on an intensity of a laser beam not passing through a wavelength filter that specifies a wavelength band of a laser beam from a semiconductor laser to be used for transmission and an intensity of a laser beam passing through the wavelength filter, an intensity of the laser beam and a wavelength of the laser beam; and
processing of storing a result of the adjustment processing.

"A semiconductor laser" according to the supplementary notes is, for example, the laser 103 in FIG. 2. FIG. 5, FIG. 6 or FIG. 7, or the laser 113 in FIG. 7. "A wavelength filter" is, for example, the wavelength filter 301 in FIG. 2. FIG. 5, FIG. 6 or FIG. 7. "A processing unit" is, for example, a portion that executes the adjustment processing of the processing unit 203 in FIG. 2. FIG. 5, FIG. 6 or FIG. 7 or the processing unit 203ax in FIG. 8.

"A storage unit" is, for example, a storage unit, which is not illustrated, included in the processing unit 203, the storage unit storing the adjustment result inside the processing unit 203 in FIG. 2. FIG. 5, FIG. 6 or FIG. 7, or the storage unit 203bx in FIG. 8. "A processing device" is, for example, the processing unit 203 in FIG. 2. FIG. 5, FIG. 6 or FIG. 7, or the+ processing device 203x in FIG. 8. "Laser current" is, for example, laser current supplied to the laser 103 by the drive unit 104 in FIG. 2. FIG. 5, FIG. 6 or FIG. 7, or laser current supplied to the laser 113 by the drive unit 114 in FIG. 7.

"A degree of cooling" is, for example, a degree of cooling of the laser 103 based on the TEC 101 in FIG. 2. FIG. 5, FIG. 6 or FIG. 7, or a degree of cooling of the laser 113 based on the TEC 111 in FIG. 7. "An optical attenuator" is, for example, the optical attenuator 801 in FIG. 5 or FIG. 6. "An optical fiber" is, for example, the optical fiber 91 or 92 in FIG. 1, FIG. 2. FIG. 5, FIG. 6 or FIG. 7.

"An optical cable" is, for example, the optical cable 90 in FIG. 1. "A transmission device" is, for example, the transmission device 10 in FIG. 1. "A communication device" is, for example, the communication device 600 in FIG. 1.

"A computer" is, for example, a computer included in the processing unit 203 in FIG. 2. FIG. 5, FIG. 6 or FIG. 7. "A processing program" is, for example, a program for causing the processing unit 203 in FIG. 2. FIG. 5, FIG. 6 or FIG. 7 to execute processing and is stored, for example, in a storage unit, which is not illustrated, included in the processing unit 203.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2020-118599, filed on Jul. 9, 2020, the disclosure of which is incorporated herein in its entirety by reference.

REFERENCE SIGNS LIST

10 Transmission device
11 Transmission processing unit
12 Transmission unit
20 Optical repeater device
50 Reception device
51 Reception unit
52 Reception processing unit
81, 82 Optical signal
90 Optical cable
100 Laser module
101, 111 TEC
102, 112, 601 PD
103, 113 Laser
104, 114 Drive unit 91, 92 Optical fiber
110 Second laser module
200 Control unit
201 Cooling control unit
203, 203ax Processing unit
203bx Storage unit
203x Processing device
204 Current control unit
206 Optical selector control unit
207 Optical attenuator control unit
211 Second cooling control unit
214 Second current control unit
301 Wavelength filter
401, 402, 403, 404, 412, 413 CPL
501 Optical selector
600 Communication device
701 Optical terminator
801 Optical attenuator

What is claimed is:

1. A processing device comprising:
a processor configured to execute adjustment processing for adjusting, based on an intensity of a laser beam not passing through a wavelength filter which specifies a wavelength band of the laser beam from a semiconductor laser for a transmission, the intensity of the laser beam, and adjusting, based on the intensity of the laser beam not passing through the wavelength filter and the intensity of the laser beam passing through the wavelength filter, the wavelength of the laser beam; and
a storage configured to store a result of the adjustment processing,
wherein the processor executes the adjustment processing for a plurality of the semiconductor lasers, and
wherein the processor executes, when the adjustment processing for one of the semiconductor lasers is executed and the adjustment of the intensity and the wavelength of the laser beam for the one of the semiconductor lasers reaches a limit, the adjustment processing for one of the other the semiconductor lasers.

2. The processing device according to claim 1, wherein the processor executes the adjustment processing such that the intensity of the laser beam and the wavelength of the laser beam fall within a predetermined range.

3. The processing device according to claim 2, wherein the predetermined range of the intensity of the laser beam and the wavelength of the laser beam is to be used for transmission based on the laser beam.

4. The processing device according to claim 1, wherein the result of the adjustment processing includes a value of laser current to be used for driving the semiconductor laser and a degree of cooling of the semiconductor laser.

5. The processing device according to claim 1, wherein the processor executes the adjustment processing in such a way that the intensity of the laser beam not passing through the wavelength filter and the intensity of the laser beam passing through the wavelength filter would establish a set relationship.

6. The processing device according to claim 5, wherein, in the set relationship, a ratio of the laser beam passing through the wavelength filter is substantially maximum.

7. The processing device according to claim 1, wherein the processor cuts off or attenuates, at a time of the adjustment processing, passage of the laser beam to an outside.

8. The processing device according to claim 7, wherein the processor performs the cutting-off or the attenuation by using an optical attenuator.

9. The processing device according to claim 1, wherein, based on the result of the adjustment processing, the processor executes transmission processing relating to transmission based on the laser beam.

10. The processing device according to claim 9, wherein the transmission processing includes processing of amplitude-modulating the laser beam as a transmission signal for the transmission.

11. The processing device according to claim 10, wherein the amplitude-modulation processing is executed by processing of modulating a degree of attenuation of the laser beam by an optical attenuator.

12. The processing device according to claim 1, wherein the transmission is performed to an optical fiber.

13. The processing device according to claim 1, wherein the transmission is performed to a plurality of optical fibers.

14. The processing device according to claim 13, wherein the plurality of optical fibers include an optical fiber to be used for optical communication toward a certain direction and an optical fiber to be used for optical communication toward an opposite direction.

15. The processing device according to claim 12, wherein the optical fiber is included in an optical cable.

16. The processing device according to claim 15, wherein the optical cable is a submarine cable.

17. A processing method comprising:
adjusting, based on an intensity of a laser beam not passing through a wavelength filter which specifies a wavelength band of the laser beam from a semiconductor laser for a transmission, the intensity of the laser beam, and adjusting, based on the intensity of the laser beam not passing through the wavelength filter and the intensity of the laser beam passing through the wavelength filter, the wavelength of the laser beam; and
storing a result of the adjustment,
wherein the adjustment processing is executed for a plurality of the semiconductor lasers, and
wherein, when the adjustment processing for one of the semiconductor lasers is executed and the adjustment of the intensity and the wavelength of the laser beam for the one of the semiconductor lasers reaches a limit, the adjustment processing for one of the other semiconductor lasers is executed.

18. A recording medium recording a processing program causing a computer to execute:
adjustment processing being processing of adjusting, based on an intensity of a laser beam not passing through a wavelength filter which specifies a wavelength band of the laser beam from a semiconductor laser for a transmission, the intensity of the laser beam, and adjusting, based on the intensity of the laser beam not passing through the wavelength filter and the intensity of a laser beam passing through the wavelength filter, the wavelength of the laser beam; and
processing of storing a result of the adjustment processing,
wherein the adjustment processing is executed for a plurality of the semiconductor lasers, and
wherein, when the adjustment processing for one of the semiconductor lasers is executed and the adjustment of the intensity and the wavelength of the laser beam for the one of the semiconductor lasers reaches a limit, the adjustment processing for one of the other semiconductor lasers is executed.

* * * * *